US012043338B1

(12) United States Patent
Tacklind et al.

(10) Patent No.: US 12,043,338 B1
(45) Date of Patent: Jul. 23, 2024

(54) DYNAMICALLY BALANCED IN-LINE WHEEL VEHICLE

(71) Applicant: Twill Tech, Inc., Palo Alto, CA (US)

(72) Inventors: Christopher Tacklind, Palo Alto, CA (US); Cameron Tacklind, Palo Alto, CA (US); Blake Tacklind, Palo Alto, CA (US); Daniel Shaffer, Palo Alto, CA (US); Nelson Au, Foster City, CA (US)

(73) Assignee: TWILL Technology, Inc., East Palo Alto, CA (US)

( * ) Notice: Subject to any disclaimer, the term of this patent is extended or adjusted under 35 U.S.C. 154(b) by 317 days.

(21) Appl. No.: 17/501,159

(22) Filed: Oct. 14, 2021

Related U.S. Application Data

(60) Continuation of application No. 16/200,559, filed on Nov. 26, 2018, now Pat. No. 11,155,302, which is a division of application No. 12/130,295, filed on May 30, 2008, now abandoned.

(60) Provisional application No. 60/998,986, filed on Oct. 15, 2007, provisional application No. 60/994,334, filed on Sep. 18, 2007, provisional application No. 60/932,555, filed on May 31, 2007.

(51) Int. Cl.
| | |
|---|---|
| *B62K 11/00* | (2006.01) |
| *A61G 5/10* | (2006.01) |
| *A61G 5/14* | (2006.01) |
| *B62K 3/00* | (2006.01) |
| *B62K 3/16* | (2006.01) |
| *G01M 17/06* | (2006.01) |

(52) U.S. Cl.
CPC .......... *B62K 11/007* (2016.11); *A61G 5/1078* (2016.11); *A61G 5/14* (2013.01); *B62K 3/005* (2013.01); *B62K 3/16* (2013.01); *G01M 17/06* (2013.01)

(58) Field of Classification Search
CPC .... B62D 21/14; B62K 11/007; B62J 45/4151; B60W 2300/46
See application file for complete search history.

(56) References Cited

U.S. PATENT DOCUMENTS

| | | | |
|---|---|---|---|
| 4,293,052 | A | 10/1981 | Daswick et al. |
| 4,506,902 | A | 3/1985 | Maebe |
| 4,691,798 | A | 9/1987 | Engelbach |
| 4,852,945 | A | 8/1989 | Rowles et al. |
| 5,217,087 | A | 6/1993 | Ikegami et al. |
| 5,372,211 | A | 12/1994 | Wilcox et al. |
| 5,423,230 | A | 6/1995 | Olander et al. |
| 5,515,934 | A | 5/1996 | Davis |
| 5,524,439 | A | 6/1996 | Gallup et al. |

(Continued)

FOREIGN PATENT DOCUMENTS

| | | |
|---|---|---|
| EP | 1561674 A1 | 8/2005 |
| EP | 1161902 B1 | 10/2005 |

(Continued)

*Primary Examiner* — Kevin Hurley
(74) *Attorney, Agent, or Firm* — Asif Ghias

(57) ABSTRACT

A family of vehicles is presented which exploit dynamic controls to stabilize in-line two wheeled vehicles. The stabilization results in improved safety at high speeds and on uncooperative surfaces. Stabilization affords balance at zero speed without auxiliary support means. Transformational wheel base length affords high visibility at low speeds and low drag at high speeds. In wheel chair configurations transforming wheel base length allows navigation up and down stairs.

4 Claims, 17 Drawing Sheets

(56) References Cited

U.S. PATENT DOCUMENTS

| | | |
|---|---|---|
| 5,685,388 A | 11/1997 | Bothwell et al. |
| 5,810,373 A | 9/1998 | Miranda |
| 5,820,439 A | 10/1998 | Hair, III |
| 5,971,091 A | 10/1999 | Kamen et al. |
| 6,112,843 A | 9/2000 | Wilcox et al. |
| 6,140,957 A | 10/2000 | Wilson et al. |
| 6,170,847 B1 | 1/2001 | Pham |
| 6,219,604 B1 | 4/2001 | Dilger et al. |
| 6,325,441 B1 | 12/2001 | Ugolini |
| 6,802,381 B1 | 10/2004 | Koors et al. |
| 7,006,901 B2 | 2/2006 | Wang |
| 7,111,861 B2 | 9/2006 | Pender |
| 7,426,970 B2 | 9/2008 | Olsen |
| 7,497,294 B2 | 3/2009 | Tsujii et al. |
| 7,520,358 B2 | 4/2009 | Ehmanns et al. |
| 7,610,131 B2 | 10/2009 | Kojima |
| 8,840,131 B1 | 9/2014 | Calley |
| 8,894,088 B2 | 11/2014 | Lark, Jr. et al. |
| 10,028,870 B2 | 7/2018 | Olsson |
| 10,457,342 B2 | 10/2019 | Kama et al. |
| 10,654,362 B2 | 5/2020 | Kama et al. |
| 11,155,302 B1 | 10/2021 | Tacklind et al. |
| 2003/0010554 A1 | 1/2003 | Grong et al. |
| 2003/0155167 A1 | 8/2003 | Kamen et al. |
| 2003/0220731 A1 | 11/2003 | Zierolf |
| 2004/0098185 A1 | 5/2004 | Wang |
| 2005/0248110 A1 | 1/2005 | Stouffer |
| 2006/0254841 A1 | 11/2006 | Strong |
| 2008/0116665 A1 | 5/2008 | Nakaizumi et al. |
| 2008/0295595 A1 | 12/2008 | Tacklind et al. |
| 2011/0241310 A1 | 10/2011 | Donahue |
| 2017/0071804 A1 | 3/2017 | Olsson |

FOREIGN PATENT DOCUMENTS

| | | |
|---|---|---|
| EP | 2228240 A2 | 9/2010 |
| GB | 2433236 A | 6/2007 |
| WO | WO2005077736 A1 | 8/2005 |
| WO | WO2006009582 A2 | 1/2006 |

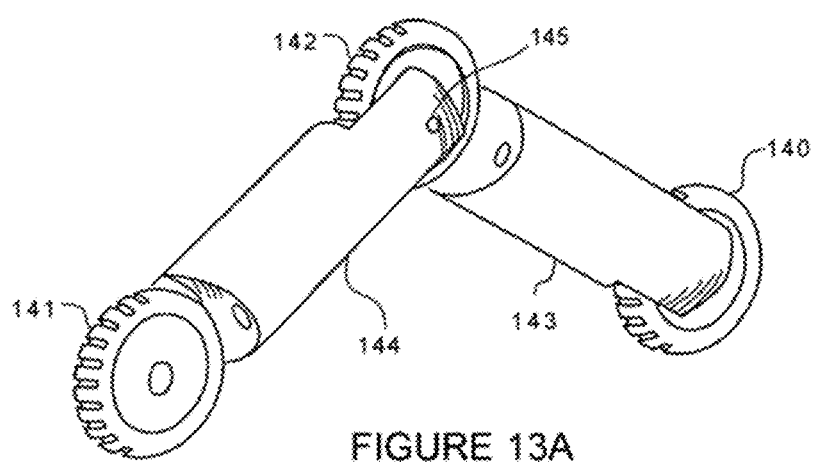
FIGURE 13A
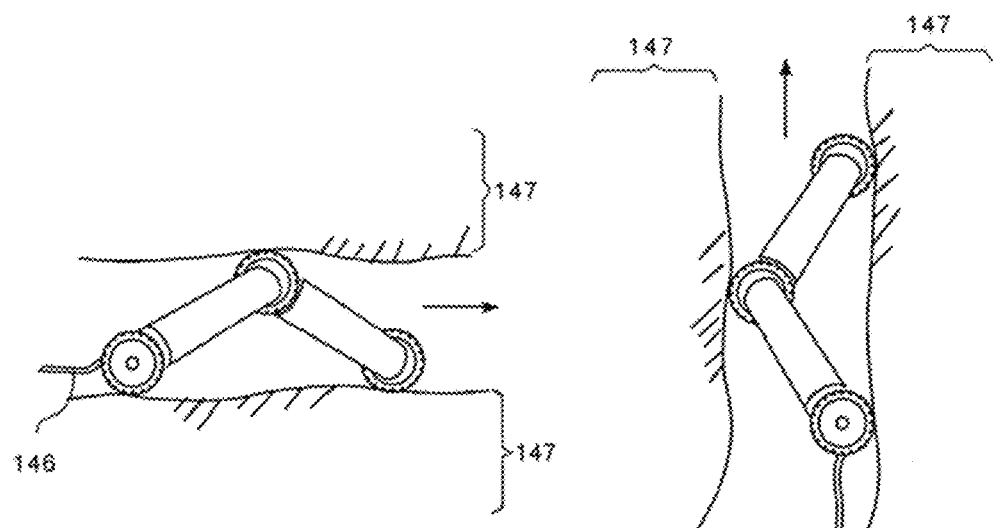
FIGURE 13B
FIGURE 13C

US 12,043,338 B1

DYNAMICALLY BALANCED IN-LINE WHEEL VEHICLE

RELATED APPLICATIONS/PRIORITY CLAIM

This application is a continuation of and claims priority under 35 USC 120 to U.S. patent application Ser. No. 16/200,559 filed Nov. 26, 2018 (to be issued as U.S. Pat. No. 11,155,302 on Oct. 26, 2021 that is in turn a divisional of and claims priority under 35 USC 120 to U.S. patent application Ser. No. 12/130,295 filed May 30, 2008 and entitled "Dynamically Balanced In-Line Wheel Vehicle" that in turns claims the benefit under 35 USC 119(e) to: 1) U.S. Provisional Patent Application Ser. No. 60/932,555 filed on May 31, 2007 and entitled "Dynamically Balanced In-Line Wheel Vehicles"; 2) U.S. Provisional Patent Application Ser. No. 60/994,334 filed on Sep. 18, 2007 and entitled "Balancing In-Line Wheel Vehicles B (TWILL)"; and 3) U.S. Provisional Patent Application Ser. No. 60/998,986 filed on Oct. 15, 2007 and entitled "Dynamically Balanced Vehicles C (TWILL)", all of which are incorporated herein by reference in their entirety.

FIELD

The disclosure relates to a vehicle and in particular to a dynamically balancing vehicle.

BACKGROUND

Few children have little trouble balancing a bicycle. Even at very low speeds, a bicycle is readily controlled by pedaling forward and judiciously commanding the steering angle. Bicycles designed for track racing may also be pedaled backward. With a little effort, this type of bicycle may be balanced indefinitely.

In-line two wheeled vehicles generally require a means for dealing with low to zero velocity. These generally take the form of training wheels, stands, or "putting your foot down".

The impressive body of prior art of balancing adjacent two wheel vehicles shows the remarkable possibility to balance unstable systems, such as Segway. The mathematics, sensors, and actuators of those systems are all available to apply to balancing in-line wheeled vehicles. Yet this field has not been explored in the market or prior art. Considerable advantages may be realized by this new class of vehicles. Transforming configurations may span utility from wheelchairs to racing vehicles.

The Segway two wheeled balancing personal transporter was introduced with much fanfare. While brilliantly implemented, it is unlikely to live up to the dream that "cities will be re designed around it". The safety shortcomings and extreme demand on control authority make this a very limited vehicle.

Bicycles, on the other hand, are very reliable, safe and fulfill a wide variety of utilitarian functions. Many cities are designed to suit bicycles. It is not surprising that electric bicycles are quickly transforming the streets of China, blurring the line between bicycles and scooters. Extension of in-line vehicles to include enclosed vehicles are common in the prior art. But all of these require an auxiliary means for stabilizing the vehicle at low to zero speed.

The existence of the Segway clearly demonstrates the power and possibilities of dynamic balancing. The main thrust of the Segway art is in using leaning to command the motion of the vehicle. This art describes the application of this idea to two adjacent wheel vehicles and wheel "statically stable" vehicles. The prior art does not anticipate the application of active balancing to two-wheel in-line vehicles. The prior art does include two in-line wheeled vehicles that are stabilized by using torque from a large mechanical gyroscope. These are heavy archaic vehicles are collectively known as Gyrocars. Ford Motor company produced sample Gyrocars in the 1960s.

A vehicle with two adjacent wheels, such as the Segway, requires a very stiff control authority and it is remarkable that these work at speed. But in the event that a wheel clips a stationary object, such as a curb or parked car, there is no way for the servo system to recover which leads to a high incidence of accidents.

Thus, it is desirable to provide a dynamically balanced in-line wheel vehicle that overcomes the problems and limitations of these conventional vehicles.

BRIEF DESCRIPTION OF THE DRAWINGS

FIGS. 13A-13C show an oblique view of a Low Profile dynamically balancing robot with a third in-line wheel;

DETAILED DESCRIPTION OF ONE OR MORE EMBODIMENTS

The system and method are particularly applicable to a dynamically balancing vehicle as illustrated and described below and it is in this context that the system and method will be described. It will be appreciated, however, that the system and method has greater utility since it can be implemented in other manners and techniques that are consistent with the described system and method.

The system and method provide a dynamically balancing vehicle that exploits controls, sensors and actuators to realize a family of in-line two wheeled vehicles. The vehicles are self balancing at rest and while in motion. Some embodiments are functional replacements of wheel chairs. Other embodiments are road worthy personal transportation devices capable of high speeds with unprecedented safety on a wide range of surfaces. The vehicle may also include transforming configurations (described below in more detail) and a seat with a conformal fit to the rider (also described below in more detail).

Figure 1:
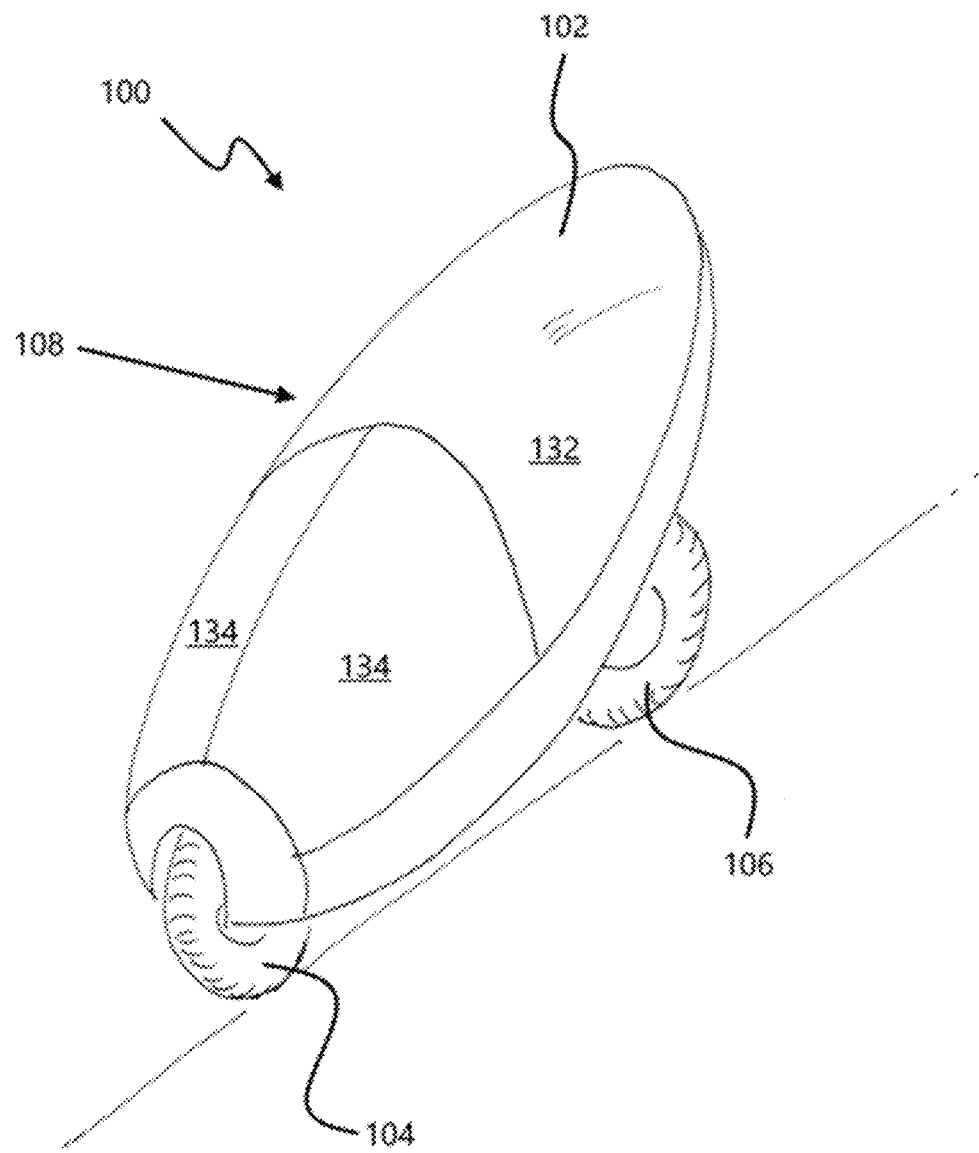
FIG. 1 illustrates an oblique view of a dynamically balancing vehicle.

FIG. 1 illustrates an oblique view of a dynamically balancing vehicle 100. The vehicle may include a body portion 102 that houses a user in a bubble 108 when the user is driving the vehicle. The vehicle may also include a first wheel 104 and a second wheel 106 wherein the two wheels are in-line with each other. In the vehicle, one wheel or both wheels is/are steerable. Unlike an early bicycle which was two fixed wheels connected to each other which was unstable, an extra degree of freedom of the steerable wheel makes the vehicle stable at low speeds or high speeds. The stability is due to the gyroscopic action of the wheels and caster on the steerable wheel and the ability to control the contact point of the wheels relative to the center of gravity. Furthermore, remarkably small control inputs are needed to maintain stability, although more control input is needed at lower speeds. The bubble 108 (described in more detail in FIG. 7) has a front section 132 and a pair of lower panels 134.

Figure 2A:
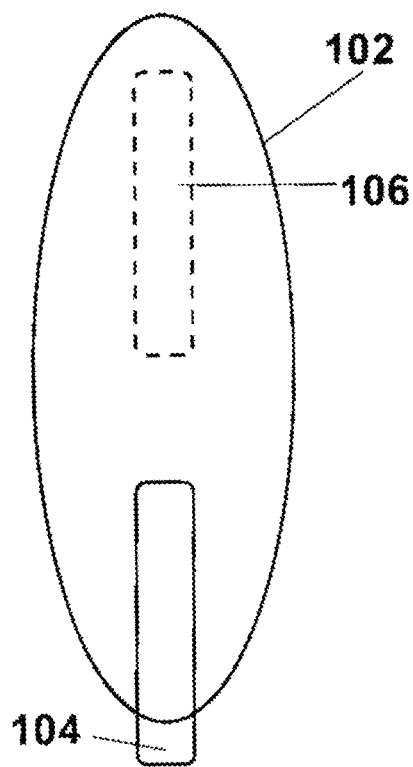
FIGS. 2A and 2B illustrate the dynamically balancing vehicle in two different steering/balancing positions.
Figure 2B:
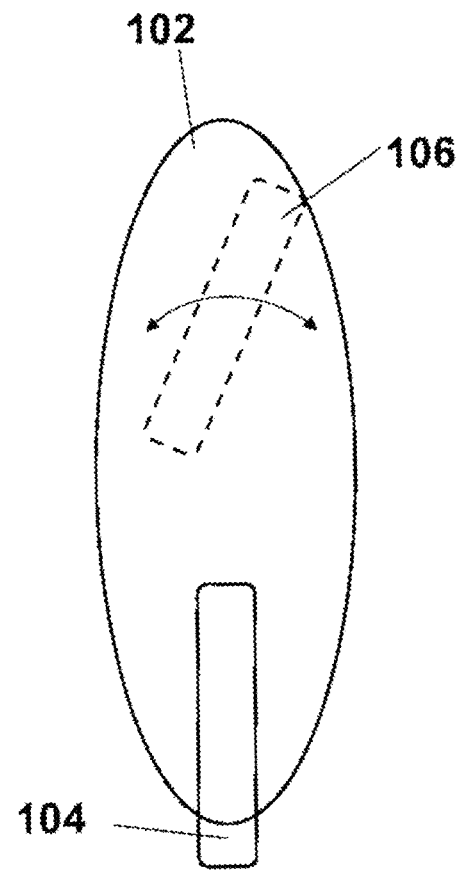

FIGS. 2A and 2B illustrate the dynamically balancing vehicle in several different steering/balancing positions. As shown in FIG. 2A, the vehicle 100 with the body 102 has its wheels 102, 104 in-line such as when the vehicle 100 is moving straight ahead. FIG. 2B shows the steering wheel (the rear wheel 106 in this example) being moved in order to steer the vehicle 100 and/or balance the vehicle (at slower speeds) whose range of movement is shown by the arrow. The steerable wheel in the in-line configuration provides the stability of the vehicle at rest, low speeds and high speeds.

Figure 2C:
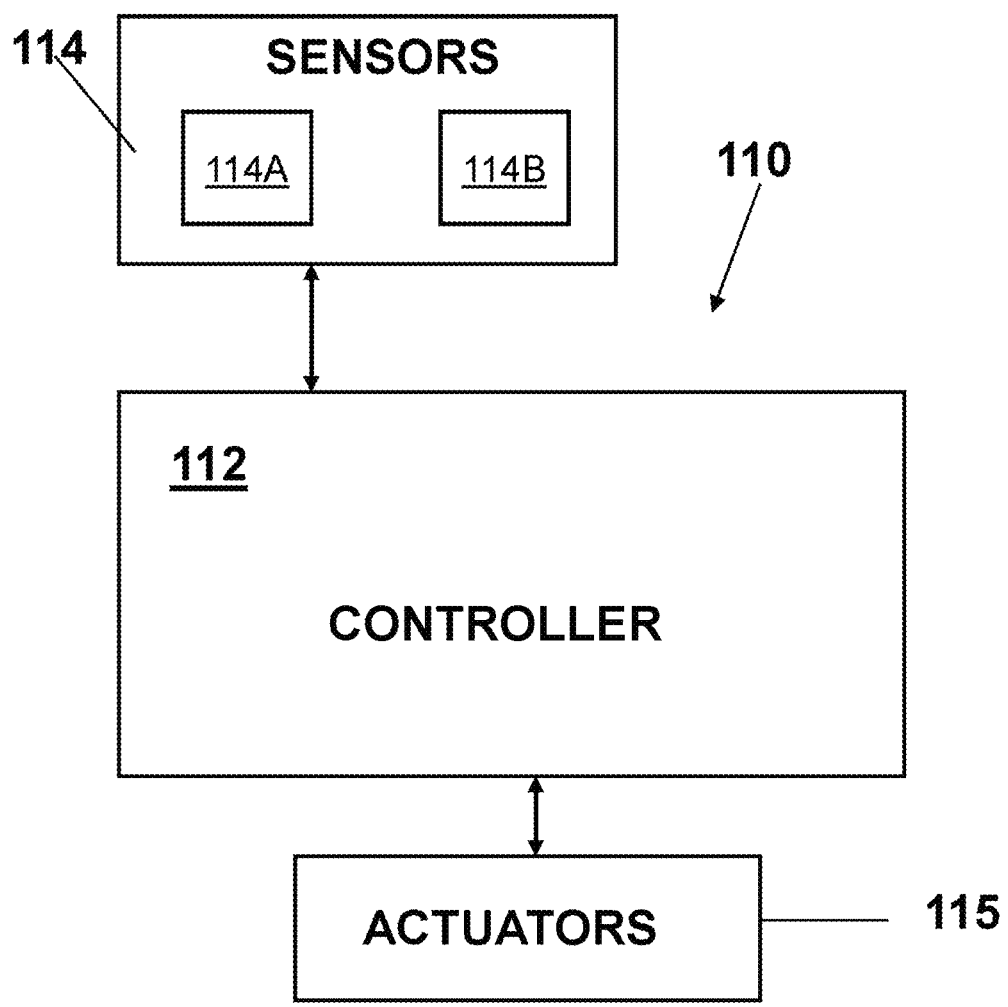
FIG. 2C illustrates an example of a control system for the dynamically balancing vehicle.

FIG. 2C illustrates an example of a control system 110 for the dynamically balancing vehicle which is incorporated into each vehicle. The control system 110 may include a controller 112, such as a microcontroller, microprocessor, processing unit based device, etc., one or more sensors 114 and one or more actuators 115 that control the wheels 104, 106 wherein the actuators 115 and one or more sensors 114 are coupled to the controller 112 by a wired, wireless, optical or other connection that allows the controller, the one or more sensors and the wheels to communicate with each other. For example, the one or more sensors 114 may include an anti-skid sensor 114A and an optical anti-slip sensor 114B. Thus, the balancing of the vehicle 100 is achieved very similarly to a bicycle, but the control outputs are commanded by the control system 110. The commands from the control system 110 (generated based on the data from the one or more sensors 114) turn the wheel or both wheels (if both wheels are steerable that may occur in some embodiments) and set the steering angle of the steerable wheel/wheels. In a typical bicycle, a human uses vision, balance and sensed forces to direct control of the bicycle. In the control system 110, the control system 110 receives data about its environment from the one or more sensors 114 and generates the commands to stabilize the vehicle at any speed. The one or more sensors 114 may include, for example, solid state gyros, level sensors, optical sensors, accelerometers, etc.

Figure 3:
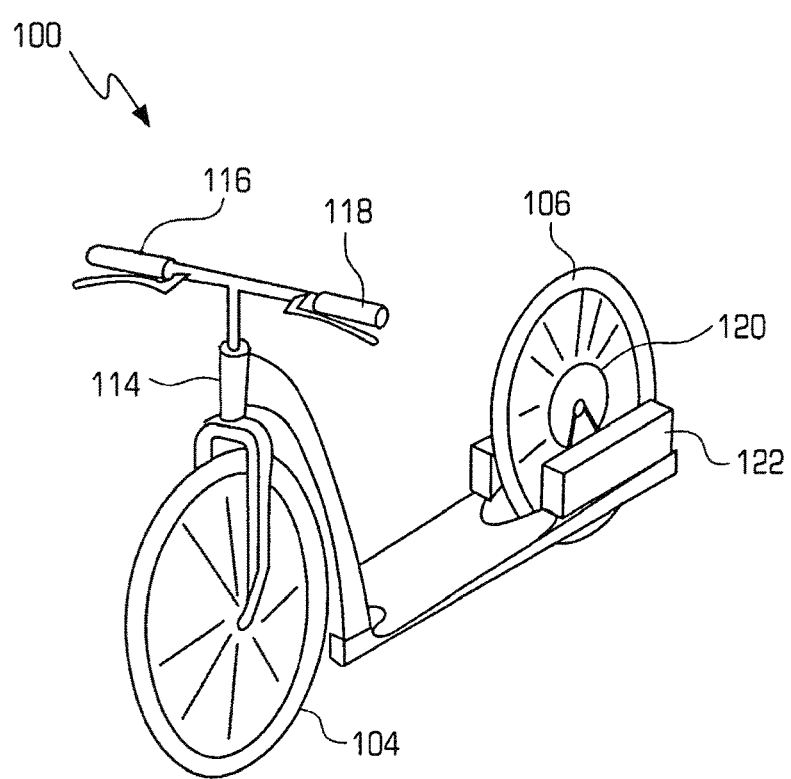
FIG. 3 illustrates another embodiment of a dynamically balancing vehicle.

FIG. 3 illustrates another embodiment of a dynamically balancing vehicle 100 that has the two wheels 104. 106, one or more steering sensors 114, a throttle 116, one or more brake levers 118, a hub motor 120 and a power source 122, such as a set of batteries. In this embodiment, the rider steers while the vehicle 100 is in motion. However, as the speed approaches zero, the steering need only be angled to one side or the other to allow the actuators 115 (not shown, but that may be wheel servos in this embodiment) take over the job of balancing at zero speed. In this embodiment, a sensor may detect the steering angle. This sensor may be, for example, a switch, a potentiometer, an optical encoder or a magnetic encoder. When the vehicle is commanded to move forward, the driver controls the steering. In an embodiment with a gas powered motorcycles that have a starter motor, a reconfiguration with the dynamic controls can be used to make a self balancing motorcycle with the starter motor providing the position servo.

The methods used by the control system to maintain the balance of the vehicle should be straight-forward. For example, static balance is readily demonstrated by using reflective range sensors looking at the ground so that, the properly calibrated sensors will be equidistant from the ground when balanced. Then, a well known proportional-integral-derivative controller (PID controller) commands the wheels to move to correct any error. For example, if the center of gravity changes slightly, such as when the rider shifts in the seat, the vehicle would roll forward with the steering turned in a constant velocity turn. The offset in level of the sensors could then be quickly reset as much as necessary so that it balances at zero speed. Alternatively, more sophisticated methods as known in the art such as Kalman filters may be used.

In the embodiment shown in FIG. 1, the front wheel 104 may be fixed and the rear wheel 106 steers. In many embodiments, the steering angle is commanded by the control system 110. At speed, small corrections in angle are hardly noticeable as the system endeavors to keep the vehicle balanced. At lower speeds, the corrections may be more pronounced. Even the direction of the steered angle may change abruptly from one side to the other. At a commanded speed of zero, the wheel is likely to stay fixed at an oblique angle. The agile rotations of the wheels are all that is needed to maintain plumb and stationary. In response to disturbance inputs, the wheels would respond quickly, moving the contact point as needed. The steering angle could also change abruptly to affect balance.

The vehicle with the in-line wheels works well on all surfaces. The footprint of the vehicle is very small so smaller roadways and paths may be used. For example, if the roadway is slanted to the side, the vehicle continues to implement its control algorithm to keep the vehicle stable and plumb. As another example, in a constant radius turn, a suitable constant bank angle is commanded. The sensors of the control system may be used to interpret the available surface in order to avoid obstacles. The control system is also able to respond to the roadway and recover from external influences like a curb collision.

Figure 4A:
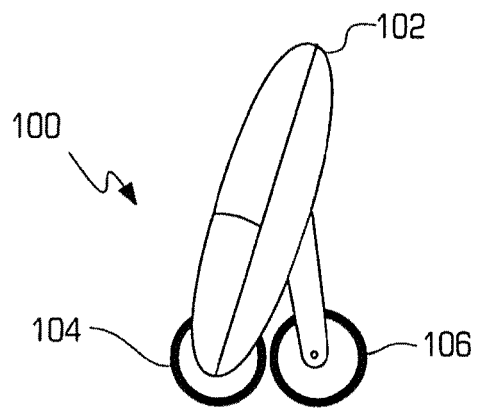
FIGS. 4A-4C illustrate the dynamically balancing vehicle with a transforming wheelbase.
Figure 4B:
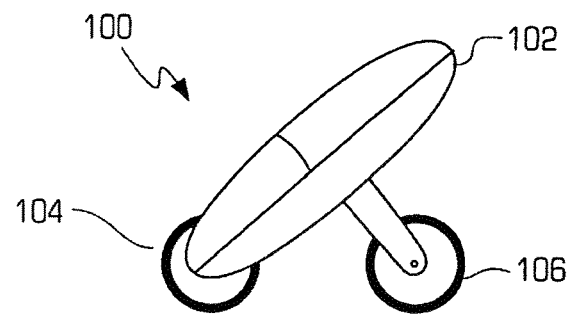
Figure 4C:
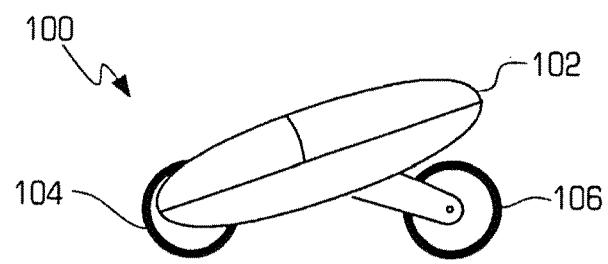

FIGS. 4A-4C illustrate the dynamically balancing vehicle 100 with a transforming wheelbase. As shown in FIG. 4A, the vehicle 100 with the body portion 102 is in a short wheel base configuration with the wheels 104, 106 close together and the body portion 102 in a more upright configuration so that entering the vehicle is like stepping into a phone booth. FIG. 4B shows the vehicle 100 in a low speed configuration that has a slightly longer wheelbase for low speed maneuvering. Finally, FIG. 4C shows the vehicle 100 in a high speed configuration that has a longer wheelbase. The vehicle can transform between the three configurations shown in FIGS. 4A-4C automatically or based on user commands.

The configuration shown in FIG. 4A is a tall vehicle with a short wheelbase that is very maneuverable, compact, agile and easier to balance. The vehicle can be parked in a storage space/garage while in the tall configuration since, in that configuration, the vehicle requires less space since the balance servos are operating and the vehicle is still actively balancing. Thus, in response to an external push the vehicle will just move out of the way. In this mode the vehicle can be nudged into its parking space.

However, in the configuration shown in FIG. 4A, when the speed is as little as walking speed, an abrupt stop could be disastrous and cause the tall vehicle with the short wheelbase to tip over so that, as the speed increases, the wheelbase increases by, in one embodiment as shown in FIGS. 4A-4C, movement the back wheel out to increase the wheelbase. The mechanism to change the wheelbase of the vehicle may be accomplished in numerous ways. For example, in one embodiment, the rear wheel may be on an end of a lever that rotates about a substantially horizontal axis forming a scissor mechanism. Other mechanisms may include but are not limited to a four-bar linkage or a slider mechanism.

The transformation has the additional benefit of rotating the vehicle body portion 102 back as the wheelbase increases which puts the rider in a more reclined position as the speed increases. The more reclined position as the speed increases improves comfort and reduces frontal area which reduces air drag at high speeds. In some embodiments, the mechanism may be largely counterbalanced by a gas spring assembly so that the force needed to transform the vehicle wheelbase can be arbitrarily small. For dynamically balanced vehicles with powered front and rear wheels, commanding different relative positions of the wheels can control the angle of the mechanism.

Figure 5A:
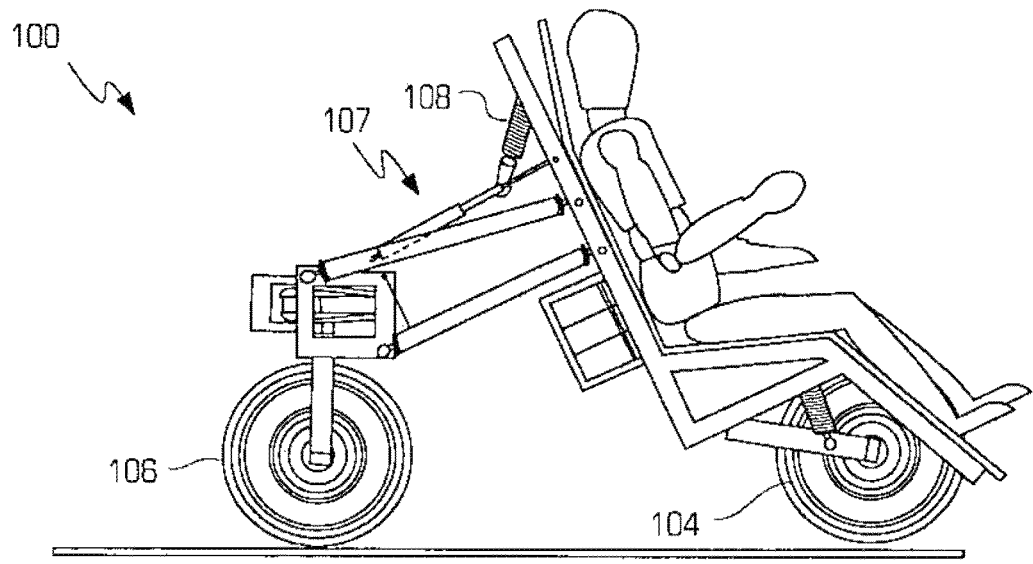
FIGS. 5A-5C illustrate a dynamically balancing wheelchair in three different configurations.
Figure 5B:
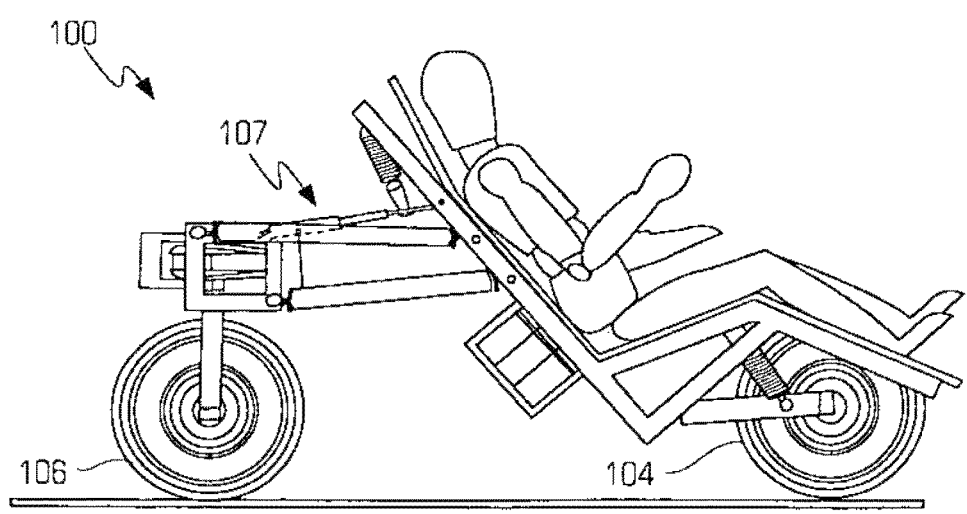
Figure 5C:
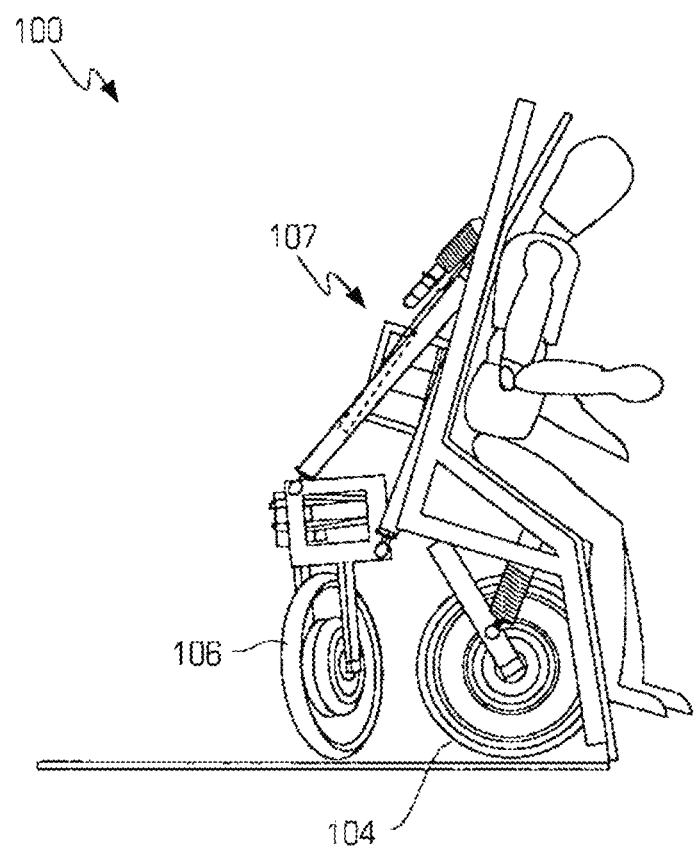

FIGS. 5A-5C illustrate a dynamically balanced wheelchair 100 with the front and rear wheels 104, 106. The wheelchair stays plumb even on inclined surfaces, such as crossing an inclined driveway which results in a much more comfortable ride with no sideways acceleration. The wheelchair 100 also has a four bar mechanism 107 that allows the front and rear wheels 104, 106 to move relative to each other and thus provide the transforming wheelbase. The four bar mechanism 107 may have one or more members that change position/angle to change the wheelbase of the vehicle and may also include a mechanism 108, such as a gas spring assembly, that counterbalances the force needed to transform the wheelbase.

The transformable wheelbase may be controlled by the control system. In addition, the control system may specify the acceleration of the dynamically balanced vehicle which will result in new dynamic experiences never before felt in a vehicle. For example, commanding maximum forward acceleration by the vehicle may result in the back wheel going backward in the first moments as the front wheel begins to race away.

Figure 6A:
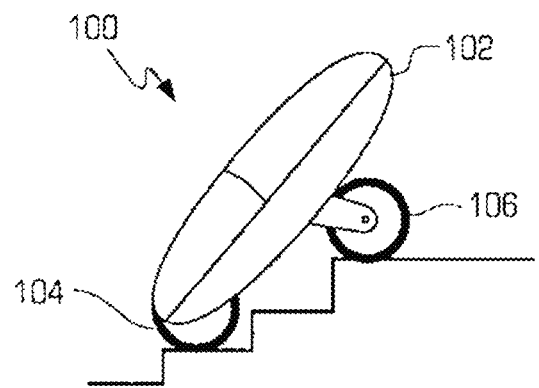
FIGS. 6A and 6B illustrates the dynamically balancing vehicle navigating an uneven surface.
Figure 6B:
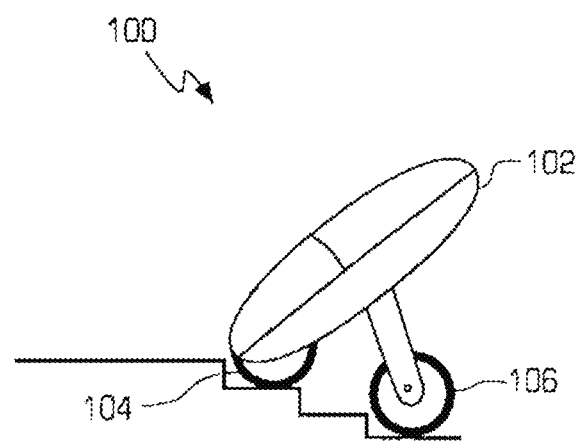

FIGS. 6A and 6B illustrates the dynamically balancing vehicle 100 navigating an uneven surface. In particular, the separation of the wheels 104, 106 may be used to navigate uncooperative surfaces including stairs such as shown in FIGS. 5A and 5B. Using the vehicle, the stairs may be traversed in an "inch worm" fashion where one wheel at a time transitions between the different steps. In addition, unprecedented responses may be devised in response to going down a step. For example, as the front wheel starts descending, the rear wheel may extend backwards to maintain a minimum safe vehicle angle as the vehicle descends the stairs.

Using the one or more sensors of the control system, the dynamically balancing vehicle may have an uncanny understanding of the surface. If sensors are provided to watch the roadway go by, an assessment may be made of the position of the vehicle compared to the commanded position. One example of this sensor is similar to an optical mouse. In one embodiment, the sensor rotates with the wheels so that the difference between the wheel position and road is detected directly. For example, if a patch of black ice is encountered, the steering angle may be commanded into the correct attitude to prevent grabbing. The vehicle can provide control authority adaptively thus keeping the vehicle in control far more effectively that a human driver.

The vehicle may have motors that drive the wheels. The motors may be electric in one embodiment. In one embodiment, the motors may be driven in both directions so that no mechanical brakes are necessary due to braking by the motor. This may also be used for regeneration of stored energy from kinetic energy as is well understood in the art.

Figure 7:
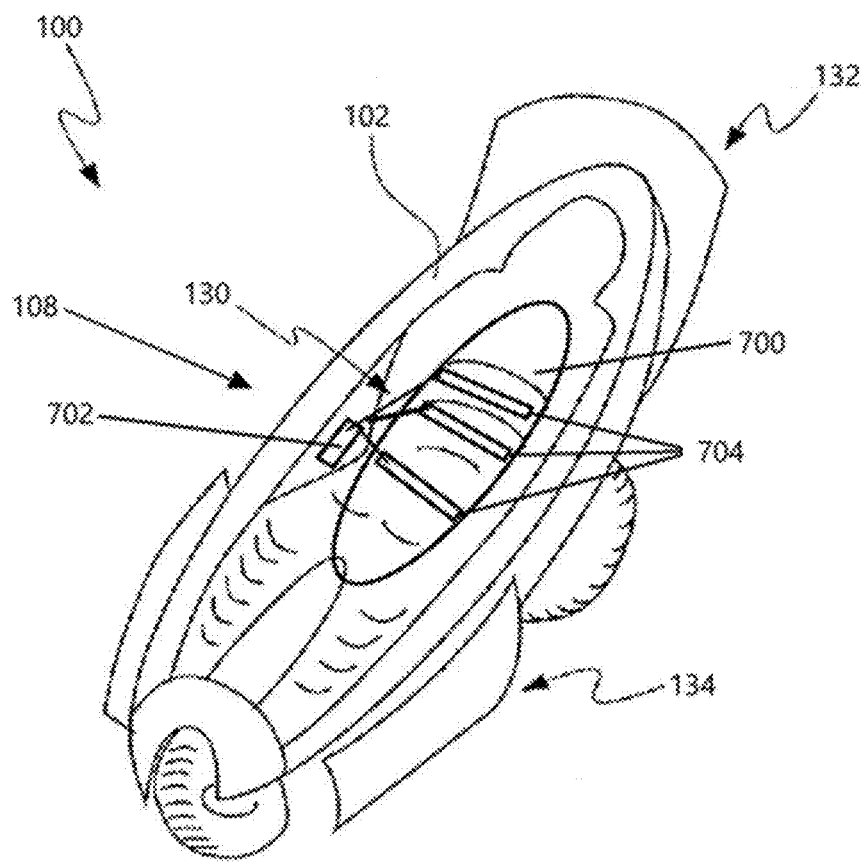
FIGS. 7 and 7B illustrate the dynamically balancing vehicle with a conformal seat and movable shields.
Figure 7B:
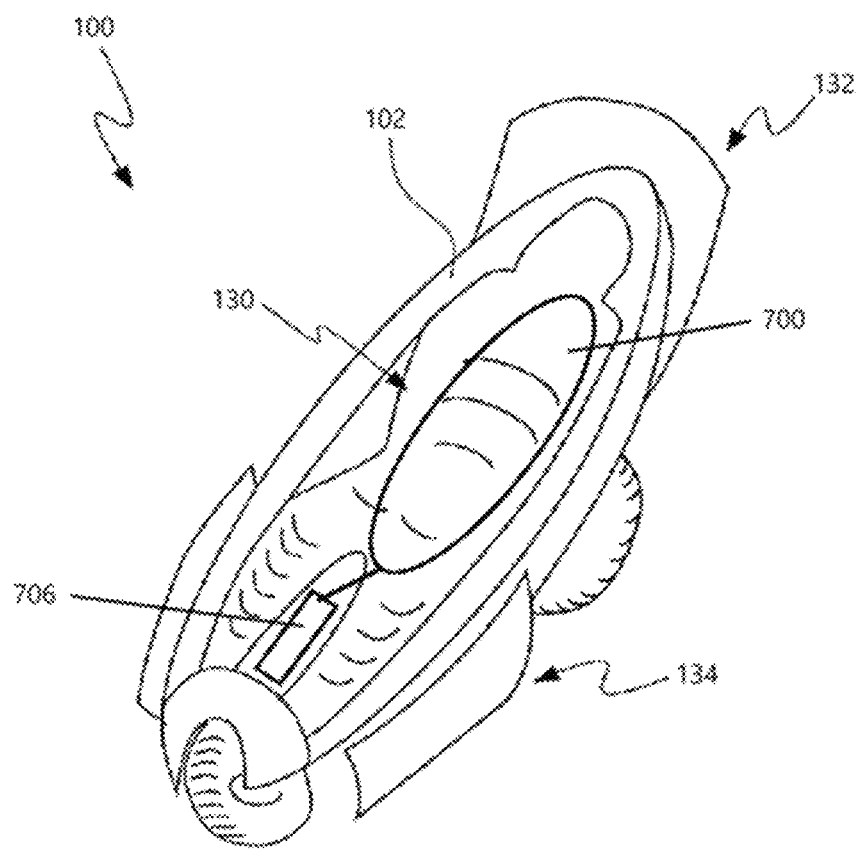

FIG. 7 illustrate the dynamically balancing vehicle 100 with a conformal seat and movable shields 132, 134 of the bubble. The dynamically balanced vehicle may have the body portion 102 that may have an occupant seat that supports the occupant. In various embodiments, the occupant seat may be a conformal seating surface 130 as shown in FIG. 7. In one embodiment, the conformal seat may be a large "bean bag" of poly styrene beads 700 in which, while in a horizontal position, the rider settles into the bean bag establishing a form fitting shape. A lock mechanism 706 shown in FIG. 7B may lock the heads into position. For example, a vacuum is pulled on the bag, locking the beads into position. A secondary mechanism may be provided to semi permanently lock the beads in place. This locked position may not have the desired level of comfort so that a mechanism may be provided to allow the beans to be adjusted while driving. In the unlikely event of a crash, the beans may be locked in an instant, affording the level of protection desired.

In one embodiment, the locking may be done by use of a vacuum and, for rapid vacuum generation, a well known venturi may be used. The air flow for the venturi may be generated by a low yield explosion, much like in an airbag deploying charge. This is even possible in conventional seats and even helmets. In a helmet, a forceful expansion could also be used to lock the helmet in intimate contact through the majority of user and thus would constitute an airbag system for helmets.

In another embodiment, the beads are carefully selected to have desired flow properties. Each selection of material or mixture of materials or size of beads or distribution of size of beads will have a particular flow characteristic. The beads may be judiciously selected to result in a non-Newtonian flow property. In this embodiment, the beads flow freely as the rider moves. But when large shear forces are applied, such as in a collision, the beads resist the flow and effectively lock into position.

As airbags deploy, they must displace the air in the vehicle. Since the air inside the dynamically balancing vehicle may be limited, the compartment air may need to be compressed or vented since the increased pressure could be detrimental to the passengers and tend to pop open the canopy. So a venturi vacuum may be used to vent the space. This will also assist the deployment of the airbags. The assist may be significant enough to reduce the demands on the explosive charge. Alternatives such as $CO_2$ expansion may be substituted as a deployment mechanism.

In one embodiment, the conformal seat may a heating and air conditioning system 702. The conformal seat may be lined with small tubes 704 and fluid pumped through the tubes may be heated or cooled to ensure the comfort of the passenger(s). Since a human only radiates 100 watts, it would stand to reason that only 50 watts would need to be pumped out of the vehicle to cool that "half" of the passenger. This is readily applied to conventional automobiles and as a replacement to electric blankets for home use, or even in a vehicle.

As shown in FIG. 7, the vehicle may also include a polycarbonate bubble that completes the vehicle outline and creates a bullet proof personal capsule as seen in FIG. 1. The vehicle may also include conventional restraints (seatbelts). In one embodiment, the vehicle may include a type of air bag that deploys and envelops the rider, filling the volume between the bubble and the rider when a collision occurs to increase the safety of the vehicle during a crash or collision. The bubble may retract gracefully in several sections 132, 134 as shown in FIG. 7. In one embodiment, the top section 132 retracts over the drivers head and stows behind the vehicle and a pair of lower panels 134 splits down the center and stow on either side of the vehicle which, unlike a sports car, makes stepping into and out of the vehicle effortless.

A small vacuum generated inside the cockpit will also serve to cinch down and temporarily lock the clear dome in place during a collision event. A very small pressure is needed since the projected area of the shell is so large. The large area of the canopy will have substantial solar gain during the day and significant radiated loss at night or in the cold. The heating and air conditioning system 702 is readily fabricated by conventional means to control the temperature of this small volume. Radiated gain and loss is largely mitigated by a sputtered reflective coating on the bubble. In one embodiment, known peltier cells may be used for air conditioning. Although these may be expensive and not as efficient they have the advantage of being compact, light and bidirectional.

The dynamically balanced vehicle may be powered by any conventional means such as an internal combustion engine. In some embodiments, the power source may be electric batteries that power electric motors that power the wheels. The batteries may be recharged whenever the vehicle is parked. The motor and gear assemblies for the electrical powered embodiment are readily fabricated that are contained in the wheel or in both wheels. Since little energy is needed to balance, the vehicle can stand still balancing while parked. Although kickstands may be useful, no auxiliary support mechanism (kickstand) is required. In the vertical configuration, the vehicle has a remarkably small footprint and so parking is also efficient. For long term storage or servicing, the rear vehicle wheel may be fully extended until the vehicle belly rests on the ground which facilitates road servicing and righting of the vehicle in the unlikely event that it is knocked over.

Figure 8:
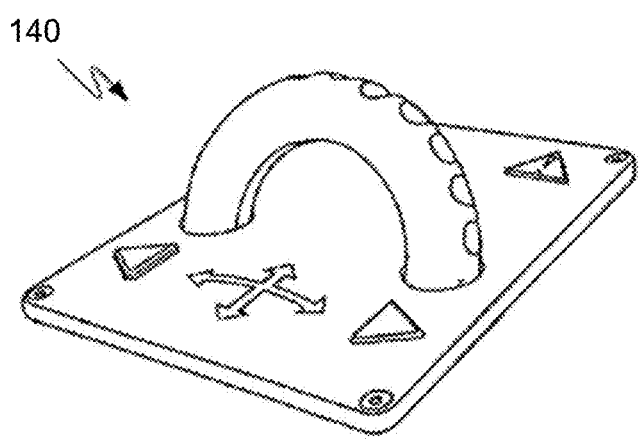
FIG. 8 illustrates an example of a user interface for user control of the dynamically balancing vehicle.

Leaning as a means of commanding motion and turning are applicable in many embodiments. The dynamically balanced vehicle may also have a user interface. In the vehicle, however, there is little need for the concept of a steering wheel. In this case, the feedback that a driver feels through the wheel is missing. Instead, it is likely that finger tip controls will be employed. For example, "haptic" feedback to control commands will be employed in some embodiments. FIG. 8 illustrates an example of a user interface 140 for user control of the dynamically balancing vehicle. For example, when commanding a turn, the deflection of the control will be limited by the current speed. As the speed decreases, the stick or wheel is allowed to move further to the side, commanding a tighter curve. Likewise, for velocity command the control stick or wheel may be gently pushed forward. The stick or wheel would resist increasing the velocity quickly. "What" is possible and "where" is possible forms a set of virtual walls in between which the vehicle can safely navigate. Other advanced input and output devices may be utilized in vehicles such as voice command, heads up displays, video rear view, and head set mounted controls.

Figure 9:
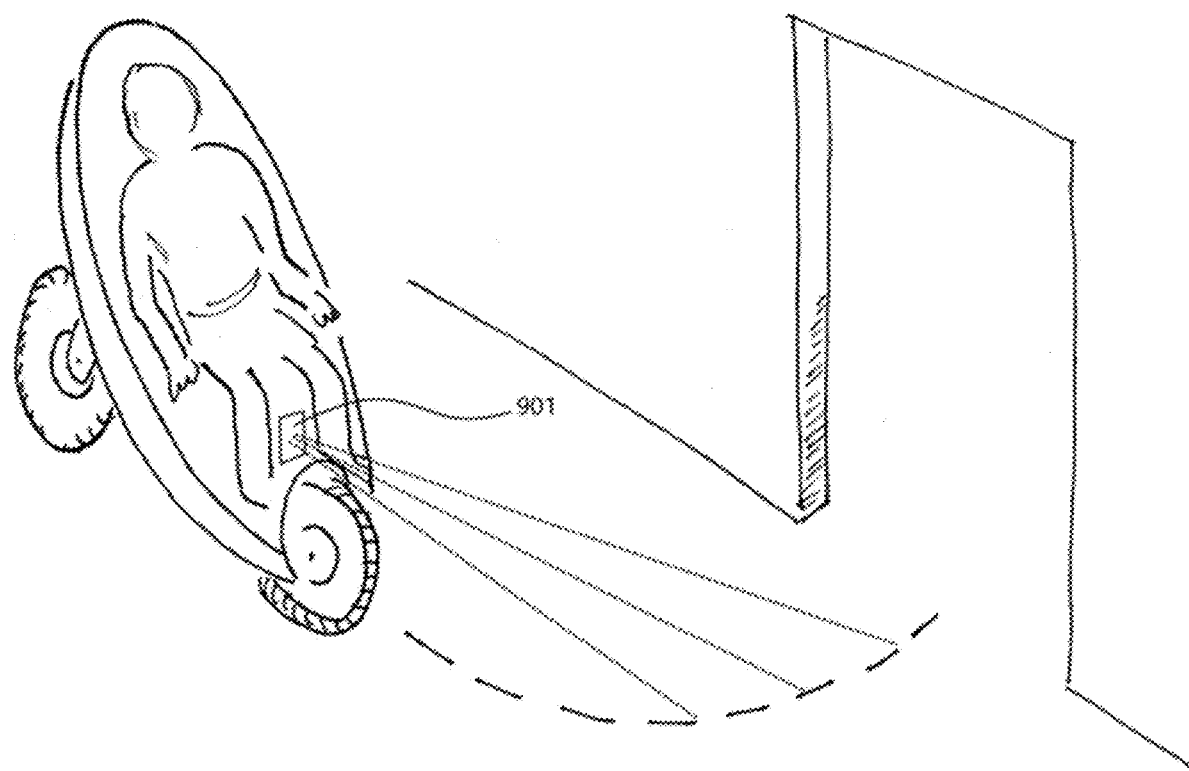
FIG. 9 illustrates a path indication system of the dynamically balancing vehicle.

Vehicles on the road typically have turn indicators. Since turn commands may be made while the vehicle is stationary, there is no outside indication of the intention of the driver. A laser system 901 may be employed to indicate the commanded path of the vehicle. For example, a row of the vehicles waiting at a red light may each have a laser line in front of them indicating the intended path of the vehicle. If the laser lines cross then a collision course has been commanded and a correction is needed by one or more drivers. This is particularly helpful in the wheelchair embodiment. In such embodiments, a laser 901 may draw a path on the floor in front of or behind the vehicle as shown in FIG. 9. This could be a straight line segment or a curve on the floor. This can be especially helpful as feedback to the driver in tight quarters such as navigating a narrow stairwell. A further laser indication could be to draw a keep out area that the vehicle needs to navigate the intended path.

Self Awareness

The dynamically balanced vehicle may include the ability to track the motion of the ground relative to the dynamically balanced vehicle. In one embodiment, the software maintains a predictive model of where the dynamically balanced vehicle is and where it should be going. If the predictive model is not in agreement with what happens the software can respond. This "self awareness" may be used to adjust the control laws and to infer the assumptions that may be made about the ground and environment. For example, if a turn request does not result in the expected roll and yaw it could be that the dynamically balanced vehicle is on a non cooperative surface. A brief increase in the control could verify that the wheels are not biting the ground as expected. The appropriate measures can be taken to deal with the decreased control authority.

The stiffness with which the servos respond may also be adjusted dynamically. For example, on an icy surface, sudden changes in steering will be ineffective. So the response of the servos can be intentionally relaxed to create smooth cautious motions. In normal driving, smooth gracious motions will be preferred. But if sudden strong commands are given the system can stiffen up and respond with the required aggressiveness as may be required to avoid a collision.

In the embodiments shown above, the dynamically balanced vehicle may be a single occupant vehicle. Other configurations readily accommodate more passengers. These include configurations with more than two in-line wheels.

In other embodiment, the dynamically balanced vehicles may be used in driving formations and live audio between the vehicles would create a virtual common space. For example, one driver could control a field of vehicles. As another example, empty vehicles could be brought along in the formation in anticipation of passengers or for materials. As another example, freight vehicles may be used on antonymous mode or follow me modes. The examples provided represent only a sample of the possible configurations and other configurations will be clear to one skilled in the art.

As an example of the dynamically balanced vehicles driving in formation, the additional vehicles may also be designed to hold materials instead of persons. For example, when a purchase is made at a point of sale, the item may be too large to fit in the dynamically balanced vehicle transporting the rider so an additional dynamically balanced vehicle may be "attached" to bring the purchase home (known as a trailer). The trailer may have any wheel configuration and connect in a conventional means. In one embodiment, the trailer has a single wheel and is attached with a universal joint to the rear of the dynamically balanced vehicle that transports the rider. The universal joint allows two degrees of freedom and one degree lets the trailer move up and down as required by the terrain while the second degree of freedom allows the trailer to bend in the direction of the turn. For the trailer, there is no degree of freedom that allows the trailer to rotate along the roll axis relative to the dynamically balanced vehicle and the trailer follows in lock step with the dynamically balanced vehicle leaning perfectly into every turn with the dynamically balanced vehicle. Such a trailer that is physically attached is also ideal for a power vehicle to carry more batteries or a co generation vehicle using other fuels. This may provide propulsion or electricity to charge batteries or current to drive the dynamically balanced vehicle's motors. But a trailer also may be "attached" in software, much as in formation driving so that the trailer "follows you home from the shop" without any physical connection to the dynamically balanced vehicle. The trailer may be returned to the store at another time or may be left at the curb for pick up. There may be a service that stops by each household where a trailer is waiting, attaches the trailers by software to a growing train of trailers and then these return to the store. In one embodiment, the dynamically balanced vehicles are all connected by a communications network so that, when an un related dynamically balanced vehicle drives by on its way to, or just in the direction of the mall, the trailer hitches a ride and is delivered back to the shop.

Multiple Riders

The dynamically balanced vehicle can readily accommodate multiple passengers. This may be done in any configuration including but not limited to tandem seating, two persons in line, adjacent seating, 2+2 seating and so on. Because of the in-line wheel configuration, more uncommon seating configurations are possible. The additional complexity of a dynamically balanced vehicle for multiple passengers involves right-left balance. In particular, for two people sitting adjacent each other in the dynamically balanced vehicle with only one person on the left side, the center of gravity of the combined system may be shifted slightly to the left. The balancing servo of the control system reassigns the zero point and balance the vehicle is shifted slightly to the right. If this shift is objectionable, one or more adjustments can be made to the system. For example, the fuel could be shifted from one tank to a second tank on the right to center the mass of the system. For an electric vehicle, the batteries could be shifted. It would also be possible to shift the wheels slightly to the left. The required shift could be small if the mass of the driver is small compared to the mass of the vehicle.

In an alternate configuration, three seats across could be provided. When this dynamically balanced vehicle is used by one person, the center seat alone is used. For two persons, the outer seats are used. For three persons, all three are used. Thus, the total system is nearly centered in each case. In one embodiment, a bench seat is used and, much like in the triple seat, the position on the seat is readily adjusted by the user to affect a sufficiently centered vehicle. For these configurations, the controls of the dynamically balanced vehicle need to accommodate any driver position. Although bench seats do not support the riders well for lateral accelerations, bench seats may be used for the dynamically balanced vehicle since no lateral acceleration is experienced by the riders. In one embodiment, the bench and back of the bench sear are of the bean bag construction described above so that the seats readily conform regardless of the position of the riders. This suggests that the dynamically balanced vehicles may be provided in a variety of widths. For example, a "1 U" might accommodate a 95th percentile male. This same 1 U could also accommodate an average woman and a small child. Other sizes would be possible including a 1.5 U and a 2 U for example.

Body Portion

While it has been described that the dynamically balanced vehicle wheel bases may be fixed or transformational it should also be clear that there may be a "body section" of the dynamically balanced vehicle in some configurations. This is evident in the case of a dynamically balanced vehicle that serves a telepresence platform. In this case, as the wheel base transforms, it may be desirable to keep the body plumb at all times. In the application of armed dynamically balanced vehicles, for military or police use, the body holding the weapon may be held plumb or be used for setting the azimuth (pitch) of the weapon. It is to be noted that dynamically balanced vehicle are particularly stiff in pitch and so are ideally suited for weapons with recoil.

This degree of freedom allows for compact storage and deployment. A folded-up dynamically balanced vehicle with a deployment chute could be deployed from an airplane and drop quickly to a designated point. Just before impact, the chute opens, the wheels deploy, and the dynamically balanced vehicle lands "on its feet" and takes off.

Stiffness in pitch also makes dynamically balanced vehicle ideally suited for applications with arms attempting pick up items along the forward axis. In the embodiment of a dynamically balanced vehicle wheelchair, the body of the vehicle may be used to lift the occupant onto the chair.

Military Litter

Another military application is for casualty evacuation by litter (gurney). A dynamically balanced vehicle is ideally suited for this application because of its ability to be wheeled along rough single track trails. This is an ideal application where the dynamically balanced vehicle is not driven but pushed. That is, the dynamically balanced vehicle responds to gentle pushes from the outside. This is similar to the parking mode disclosed earlier where the dynamically balanced vehicle may be nudged into place in the garage.

Hardened Transport

Another embodiment is a hardened troop transport. Using Kevlar and other advanced materials, a bullet proof under shell is readily produced. Improvised roadside bombs could even be deflected by reactive armor. Fitted with telemetry, advanced sensors and even weapons, such a transport would afford protection, agility and range to a modern soldier. Incorporating the dynamically balanced vehicle safety features, a soldier could be dropped from an airplane inside a dynamically balanced vehicle. Small control surfaces could be deployed to maneuver to a road below (ala James Bond). The dynamically balanced vehicle would deploy a drag chute at the last moment resulting in a hard landing, but the soldier is protected by the form fitting seat (and air bags).

Human-Electric Hybrid

The dynamically balanced vehicles are ideally suited for emerging markets. Anywhere humans walk, a single track road is created. These trails are suitable for dynamically balanced vehicles. Paved roads need only have a single track (in each direction). As the populace of China moves up the economic scale, they will want cars. Already China has surpassed Japan as the number two car market. Within decades, China will be the largest market. The energy demands and pollution created could bury the planet. Ideally, China's consumers can bypass the car stage and move directly to more efficient and compact dynamically balanced vehicles. As a step in this direction, there will be a niche for Human-electric hybrid dynamically balanced vehicles as shown in FIG. 9. In this embodiment substantial power is provide by the driver. In one embodiment, the drive train is contained on the front wheel. The rear wheel is electrically powered and servo steered as in other dynamically balanced vehicle embodiments. This produces a compact and efficient vehicle for emerging markets.

Figure 10:
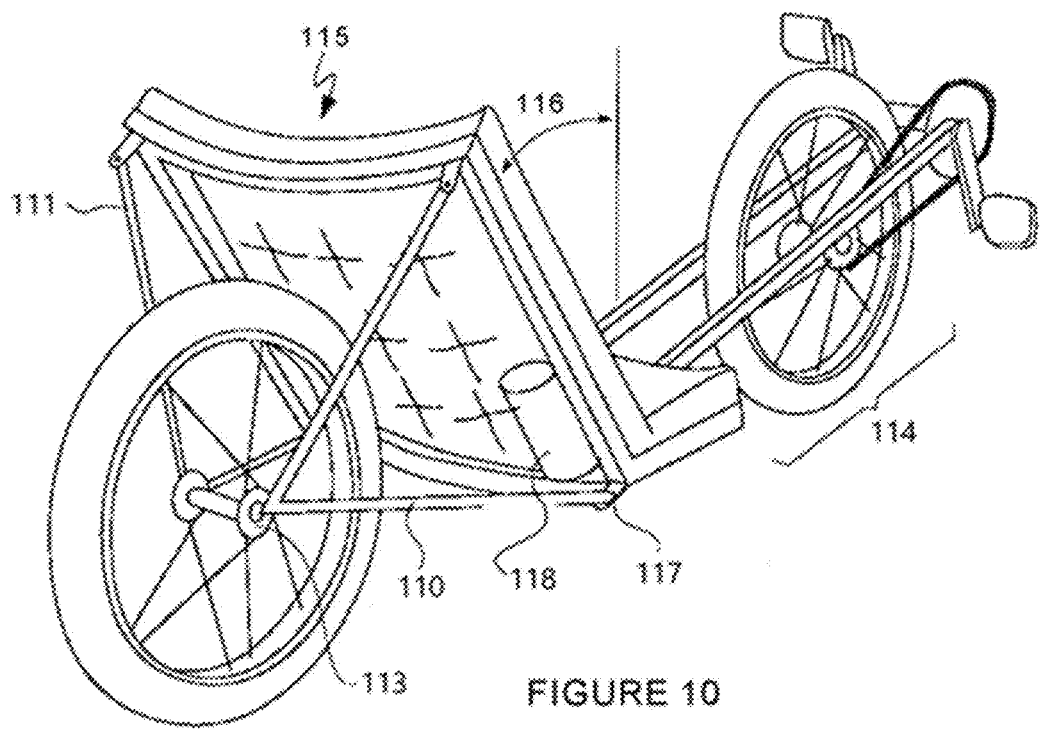
FIG. 10 shows an oblique view of a Human powered dynamically balancing vehicle.

FIG. 10 shows an oblique view of a Human powered dynamically balancing vehicle 100 that has wagging steering. In this embodiment, the wheel(s) may be attached with a fork as on a bicycle or motorcycle. A pair of swinging arms may attach to either end of the wheel's axel 113 as shown in FIG. 9. This avoids the vertical protrusion of a steering bearing tube. This particular embodiment is a human powered dynamically balancing vehicle. The entire human power train 114 is contained in the front wheel assembly. The dynamically balancing vehicle steering control 118 and any other power system may be contained behind the seat 115. The power system may include batteries, a motor/generator. The generator function readily supplies the braking function. The energy collected in the batteries may then be used to aid propulsion and to power the steering control system. The angle of the seat 116 provides a convenient hinge axis for the swinging arms.

The projections of these arms cross at a point that defines the instant center of rotation. Since the axes are angled, the axis projected to the ground intercepts in front of the contact patch of the wheel. This is a necessary and sufficient condition for the steering to have positive caster. This makes the vehicle stable at speed. So this embodiment would be suitable as a simple recumbent bicycle. In the embodiment shown, the axes 117 are parallel. Changing this angle has an effect on the steering geometry that will minimize or eliminate steering artifacts such as changing the height of the wheel as it changes. Other means such as cams, levers and pulleys may also be employed to mitigate unwanted effects and to achieve the desired level of stability.

With the electronics and battery package in the rear, the front will be easy to pick up. Appropriate details on the rear will make it practical to tilt the entire vehicle up on its back end for parking or storage. Tipped up in this manner on a charging station, electrical or inductive contact can be made automatically to charge the batteries.

Surprisingly, a dynamically balanced vehicle may be driven on a single rail. This was achieved with gyro trains by Louis Brennan 100 years ago. A dynamically balanced vehicle achieves this in the directed steering method described already. In a preferred embodiment, this is achieved using a tire with a substantially spherical shape in the region of contact with the rail. Some geometries will render the wheels stable on the rail much like the stability of a band on a crested wheel found in band saws.

A dynamically balanced vehicle with a transformational base may "lay down" by extending all the way until the belly touches the ground. But it can also stand proud to the point where the nose touches the ground. A low profile charging station could be engaged in this position. The engagement could secure the dynamically balanced vehicle in the upright position for getting in and out and for servicing.

Multiple In-Line Wheels

While the embodiments described above have two in-line wheels, the dynamically balanced vehicle may have multiple in-line wheels. Such embodiments readily replace the common configuration of small robots with treads and all the way up to elongated street worthy vehicles with a multiplicity of in line wheels as will be described herein with more detail. The transformational wheel base embodiments readily allow the dynamically balanced vehicles to assume a very low profile. In many embodiments, large wheels are preferred to accommodate rough terrain at high speeds. Small wheels allow for transformation to a very small cross section suitable for entering pipes and caves.

Figure 11:
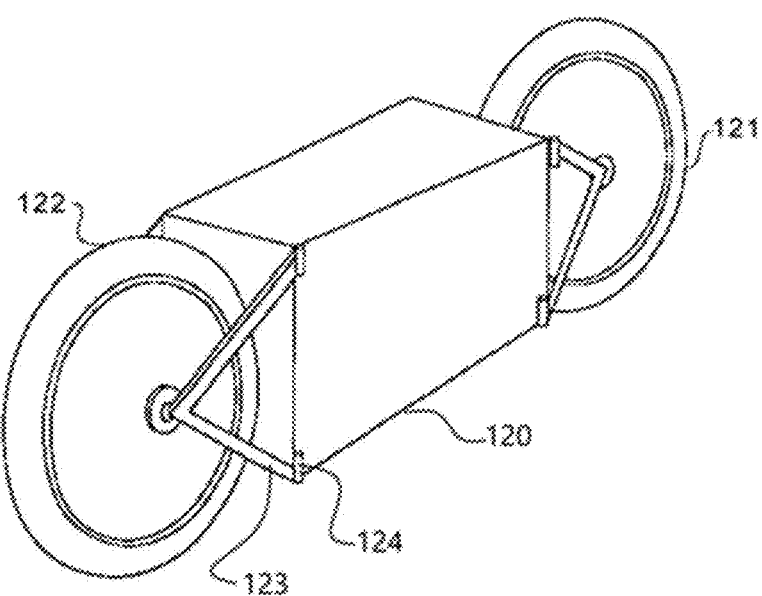
FIG. 11 shows an oblique view of a low profile dynamically balancing robot with double articulated steering.

FIG. 11 shows an oblique view of a low profile dynamically balancing robot with double articulated steering. The low profile dynamically balancing robot benefits from the same steering geometry as depicted in FIG. 10. The robot payload 120 is supported by wheels 121 and 122. The wagging links such as 123 connect at the wheel centers and pivots such as pivot 124 connect at the payload.

Figure 12A:
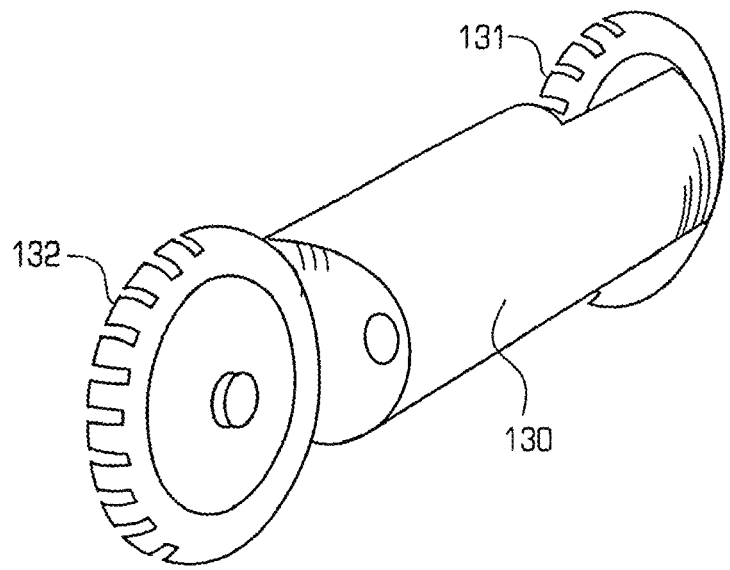
FIGS. 12A-12C show an oblique view of a Low Profile dynamically balancing robot with single direction turning.
Figure 12B:
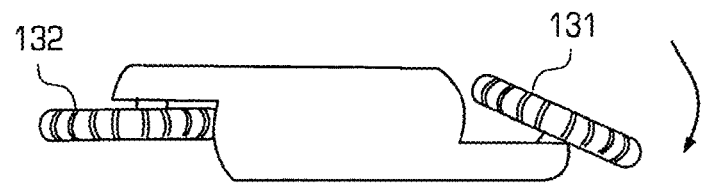
Figure 12C:
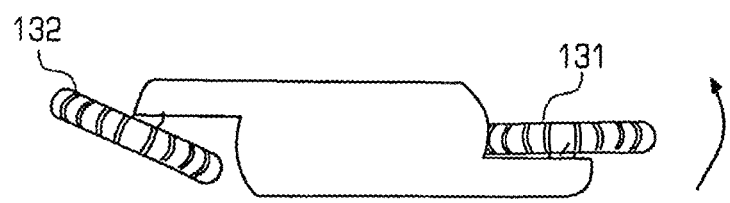

FIGS. 12A-12C show an oblique view of a Low Profile dynamically balancing robot 130 with single direction turning. In particular, in some embodiments, the wheels may be supported from one side only. If the support strut is perpendicular to the axis of rotation this would interfere with the steering rotation, but the interference is in only one direction. As shown in FIGS. 11A-11C, the front and rear wheels 131 and 132 may be suspended from opposite sides as shown in FIG. 11A so that the restricted steering travel does not restrict the steering. As depicted in FIG. 11b, a right turn is achieved by turning the front wheel 131 to the right while the rear wheel remains straight. To turn to the left, the front wheel 131 points forward and the rear wheel 132 turns as depicted in FIG. 11c. If both wheels are turned and kept parallel, the Low Profile dynamically balancing robot 130 move sideways similar to a Segway.

FIGS. 13A-13C show an oblique view of a Low Profile dynamically balancing robot with a third in-line wheel. In this embodiment, the dynamically balancing robot may have one forward wheel 140 and one rear wheel 141 and one center wheel 142 as seen in FIG. 13a. All of the axes of rotation of the wheels may be generally parallel while driving forward. In addition, the robot may have two links 143 and 144 with a central pivot 145 that are also generally parallel to the axes of rotation. The links and pivot allow the three wheels to move relative to each other.

Although the wheels may be substantially in-line vertically, the central wheel may be kinked up. This will allow engagement to the top of a tube or tunnel as depicted in FIG. 13b. In this way, substantial loading forces may be applied to the walls 147 to improve traction. This increased traction will be helpful to pull an umbilical line 146 for power and data. It also makes it possible for the robot to climb vertical shafts or tunnels as depicted in FIG. 13c. This embodiment may be further extended to include a multiplicity of wheels with many articulations. The articulation axes need not be parallel and nor do all of the wheels in different embodiments. This allows for highly complex snake-like robots that can expand to span the inside of a pipe or cave or grasp the outside of a pipe or tree. Such distended dynamically balancing robots would have no trouble traversing the most rugged of terrains.

The wheels could also be arranged such that the wheels protrude both up and down. Thus, if the dynamically balancing robot is "upside-down", it can still operate. Other wheels could protrude laterally making the vehicle substantially covered in wheels. In this case, the device may sit on wheels in such a way that it becomes statically stable. Wheels may be in lateral pairs. This would make the vehicle statically stable in all situations. These embodiments would be ideal for search and rescue missions.

A multiplicity of in line wheels may also be used on street worthy vehicles. A pubic bus could have multiple sections, each supported on one or more wheels. While turning, the assembly becomes stable. But while moving substantially in line, stability is maintained as described for other dynamically balancing robots or vehicles.

Figure 14:
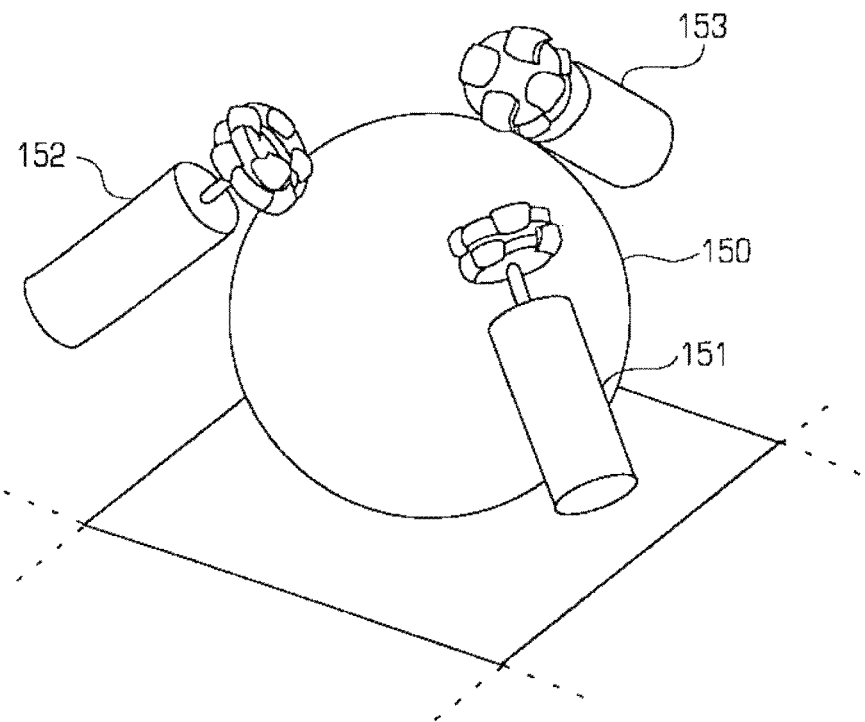
FIG. 14 shows an oblique view of a "Ball Bot" drive with yaw capability.
Figure 15:
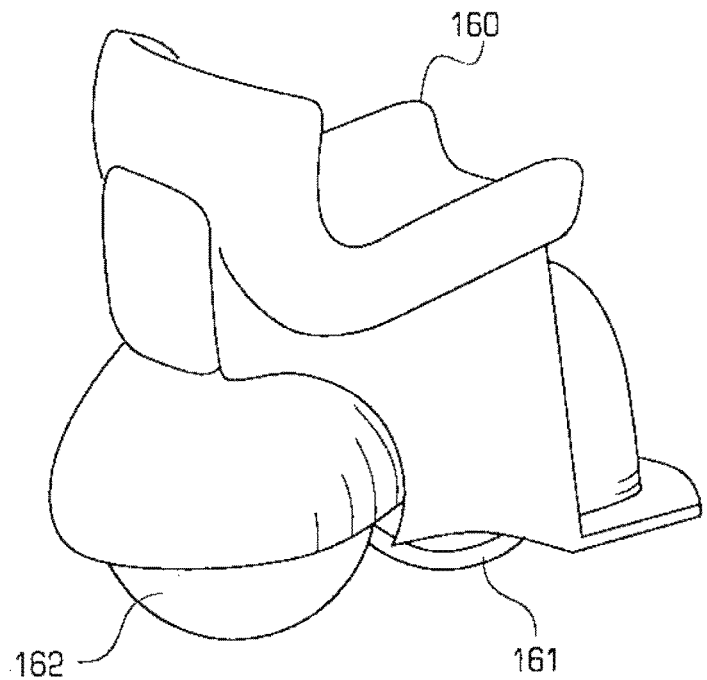
FIG. 15 shows an oblique rear view of a dynamically balancing wheelchair with a rear ball drive.

FIG. 14 shows an oblique view of a "Ball Bot" drive with yaw capability and FIG. 15 shows an oblique rear view of a dynamically balancing wheelchair with a rear ball drive.

A clever type of robot was unveiled recently by researchers at Carnegie Melon University. In this configuration, the tall thin robot sits on top of a large ball. Motor assemblies move the ball in pitch and roll under computer control. The drive is similar to the equatorial rollers in a mechanical mouse. Using input from multiple gyros sensing both axes, the bot is stabilized by moving the contact patch much like a Segway, but in two dimensions. So the bot can move freely in X and Y. No means is provided for controlling the yaw of the bot.

A configuration for the motors of the ball bot is to use three assemblies as depicted in FIG. 14. In this configuration, the axes of the three drive assemblies 151, 152, and 153 are mutually orthogonal. Their rollers contact the ball 150 at points approximately 90 degrees from each other, although the support mechanisms for the drive assemblies are not shown for clarity. The combinations of motor inputs allow motion in X and Y and Yaw. A ball bot is readily coupled with a wheel to form dynamically balancing Ball configurations. The wheel to ball axis provides the stiffness afforded by the dynamically balancing vehicle configuration. The ball provides propulsion and side to side balance without the need for a steering mechanism as seen in FIG. 15. In this embodiment of a wheelchair dynamically balancing vehicle 160 has a low profile fixed seat. A front wheel 161 may be free-wheeling or driven. A rear "wheel" 162 is a ball driven in pitch and roll as shown in FIG. 15.

Figure 16:
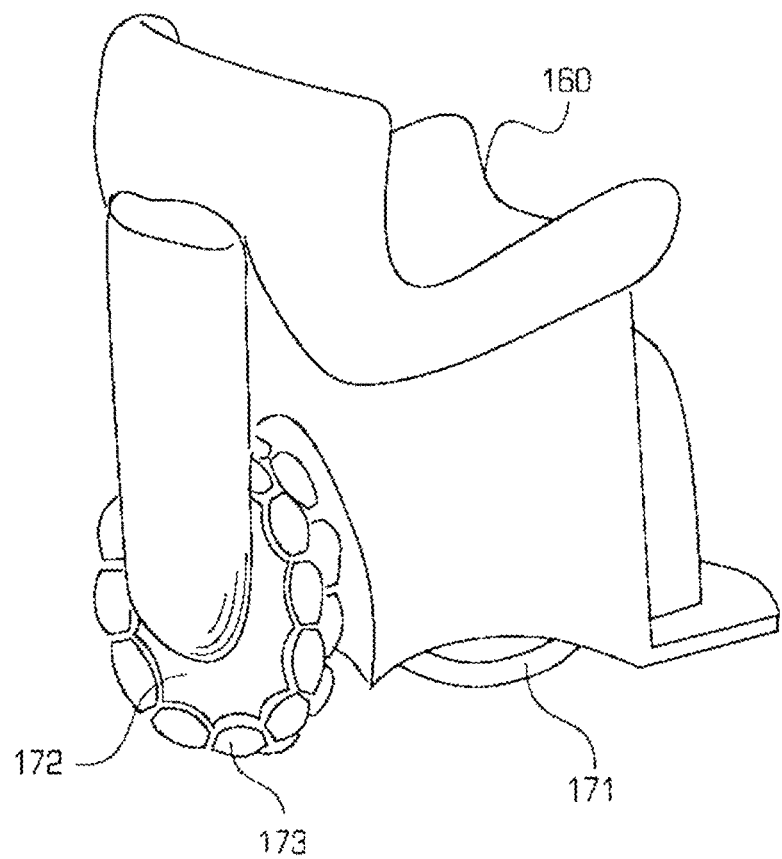
FIG. 16 shows an oblique rear view of a dynamically balancing wheelchair with a rear omni-wheel drive.

FIG. 16 shows an oblique rear view of a dynamically balancing wheelchair with a rear omni-wheel drive 172 omni-wheel may be used for the rear wheel. In this configuration, a front wheel 171 provides the propulsion and the rear wheel 172 provides the balancing function. As is common in the art, the omni-wheel includes a multiplicity of small wheels 173 that turn freely on the perimeter.

Safety Skirts

In the wheelchair configurations of the dynamically balancing vehicle, the maneuvering may be slow. In such cases, the roll angle of the dynamically balancing vehicle will be very small. Then it is simple to add features near the ground that would be close to but not touch the ground. These would serve as safety skirts just an inch or so from the ground that would have the effect of pushing away objects on the floor/surface that might otherwise engage the wheels. They may also perform as stops to limit the roll angle to prevent a tip over of the chair. In some configurations it may be desirable to use casters that engage in the event that the roll angle becomes too large.

Seats for Some Embodiments

In the previous embodiments of the wheelchair dynamically balancing vehicle, fixed seating angles were shown. However, the dynamically balancing vehicles are not constrained to fixed seating angles. Indeed, in dynamically balancing vehicle wheelchairs, the angles may need to be adjusted to suit the particular malady. This may be coupled to the transformational wheel base or be separate adjustments.

Figure 17:
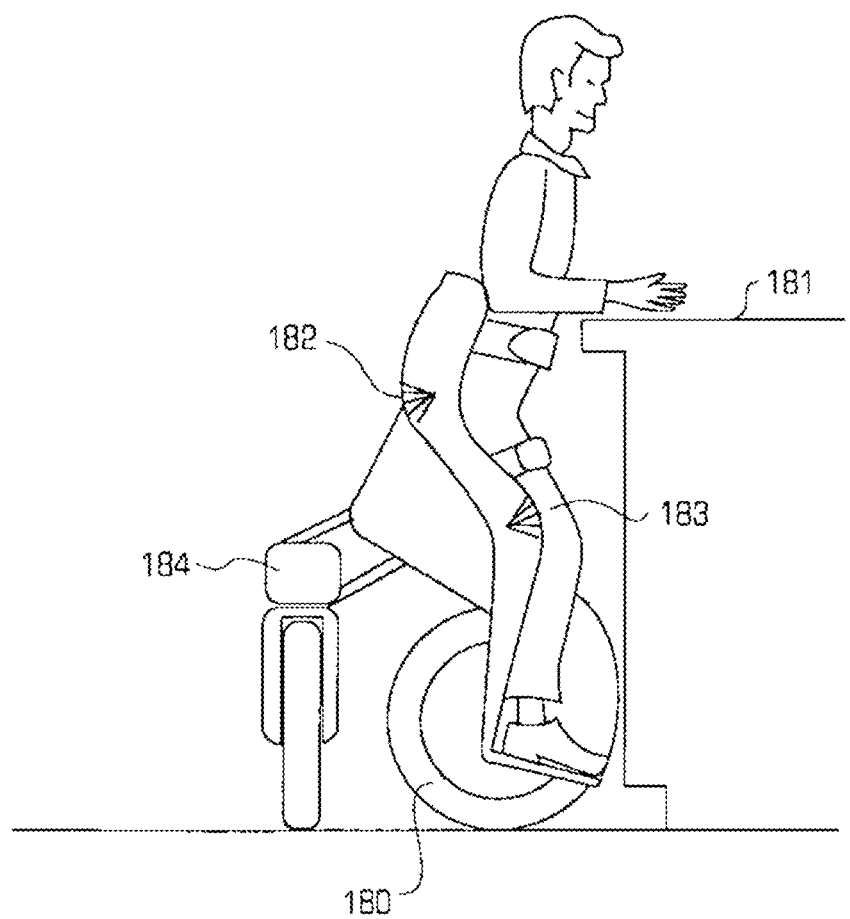
FIG. 17 shows an elevation view of a dynamically balancing wheelchair standing tall at a walk-up counter.

Thus, while the wheelchair embodiments of FIGS. 15 and 16 suggest a small fixed seat, other embodiments may have adjustable seating sections. For embodiments that are adjustable to a flat configuration, the transformational wheel base brings the rider to the same eye level as though standing as seen, for example in FIG. 17 that shows an elevation view of a dynamically balancing wheelchair standing tall at a walk-up counter. With the simplicity of a front wheel assembly 180, one is capable to come up close to a walk-up counter 181 such as in a bank or kitchen or bathroom. Thus the user is perched on the dynamically balancing vehicle tall is if standing. A set of articulations 182 and 183 adjust as a transformational base 184 moves in close creating the vertical stance shown. The articulations (similar to the scissor mechanism) are shown in more detail in FIGS. 5A-5C.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A vehicle, comprising:
   a body portion;
   a first wheel connected to the body portion wherein the first wheel is steerable;
   a second wheel inline with the first wheel that is also connected to the body portion wherein the first and second wheels are spaced apart from each other;
   one or more sensors that sense a balance of the vehicle and generate sensor signals;
   a control system that, based on the sensor signals, automatically controls the steerable wheel to maintain the balance of the vehicle;
   a manual steering mechanism that allows the driver of the vehicle to steer the vehicle; and
   one or more additional wheels in-line with the first wheel.

2. The vehicle of claim 1 further comprising one or more additional body portions wherein each additional body portion further comprises one or more of the additional wheels in-line with the first wheel.

3. A vehicle, comprising:
   a body portion;
   a first wheel connected to the body portion wherein the first wheel is steerable;
   a second wheel inline with the first wheel that is also connected to the body portion wherein the first and second wheels are spaced apart from each other;
   one or more sensors that sense a balance of the vehicle and generate sensor signals;
   a control system that, based on the sensor signals, automatically controls the steerable wheel to maintain the balance of the vehicle; and
   a manual steering mechanism that allows the driver of the vehicle to steer the vehicle;
   wherein the body portion further comprises a bubble.

4. The vehicle of claim 3, wherein the bubble further comprises a first section and a second section that move to allow entry of an occupant of the vehicle.

\* \* \* \* \*